United States Patent
Straub et al.

(10) Patent No.: US 9,714,483 B2
(45) Date of Patent: *Jul. 25, 2017

(54) STABILIZED WOVEN SEAM FOR FLAT-WEAVE ENDLESS FABRIC BELTS

(71) Applicant: VOITH PATENT GMBH, Heidenheim (DE)

(72) Inventors: Michael Straub, Steinheim (DE); Robert Eberhardt, Ellwangen (DE)

(73) Assignee: Voith Patent GmbH, Heidenheim (DE)

( * ) Notice: Subject to any disclaimer, the term of this patent is extended or adjusted under 35 U.S.C. 154(b) by 229 days.

This patent is subject to a terminal disclaimer.

(21) Appl. No.: 14/396,975

(22) PCT Filed: Apr. 18, 2013

(86) PCT No.: PCT/EP2013/058121
§ 371 (c)(1),
(2) Date: Oct. 24, 2014

(87) PCT Pub. No.: WO2013/160194
PCT Pub. Date: Oct. 31, 2013

(65) Prior Publication Data
US 2015/0096704 A1   Apr. 9, 2015

(30) Foreign Application Priority Data

Apr. 27, 2012 (DE) .................. 10 2012 207 016

(51) Int. Cl.
*D21F 7/10* (2006.01)
*D21F 1/10* (2006.01)
(Continued)

(52) U.S. Cl.
CPC ............ *D21F 7/10* (2013.01); *D03D 13/004* (2013.01); *D21F 1/0054* (2013.01)

(58) Field of Classification Search
CPC .... D21F 1/0027; D21F 1/0036; D21F 1/0045; D21F 1/0054; D21F 1/10; D21F 1/12;
(Continued)

(56) References Cited

U.S. PATENT DOCUMENTS 3,622,415 A * 11/1971 Kunsman .................. D21F 1/12
139/383 A
8,062,480 B2 * 11/2011 Eagles .................... B29C 65/16
139/383 AA (Continued)

FOREIGN PATENT DOCUMENTS

DE    102010039364 A1    2/2012
WO    2005075736 A2    8/2005
(Continued)

*Primary Examiner* — Eric Hug
(74) *Attorney, Agent, or Firm* — Laurence A. Greenberg; Werner H. Stemer; Ralph E. Locher

(57) ABSTRACT

An endless fabric belt for use in a paper, cardboard or tissue machine has machine-direction threads and cross-machine-direction threads. At least part of the threads are yarns composed substantially of a thermoplastic polymer material which is transparent for light of a wavelength. The fabric belt is a flat-weave with two front-side ends that are subsequently connected by bringing together end sections of the machine-direction threads in pairs with the formation of junction points and are woven with cross-machine-direction threads, forming a seam region. A material-to-material bond is formed in the seam region by absorbing light at the wavelength at yarn contact points. In the seam region, a plurality of spaced-apart, strip-shaped fabric sections are formed, in which the junction points and the yarn contact points which are connected to one another are arranged, and one strip-shaped fabric section without junction points is formed between two immediately adjacent fabric sections having the junction points.

19 Claims, 3 Drawing Sheets

(51) Int. Cl.
*D03D 13/00* (2006.01)
*D21F 1/00* (2006.01)

(58) Field of Classification Search
CPC ... D21F 1/105; D21F 7/08; D21F 7/10; D21F 7/12; D21F 7/083; D03D 3/04; D03D 11/00; D03D 13/00; D03D 13/004; D03D 13/008; D03D 1/0094; D03D 25/00
USPC .......... 162/348, 358.2, 900–904; 139/383 A, 139/383 AA, 425 A
See application file for complete search history.

(56) References Cited

U.S. PATENT DOCUMENTS

| | | |
|---|---|---|
| 8,088,256 B2 | 1/2012 | Hansen et al. |
| 8,608,909 B2 | 12/2013 | Scherb et al. |
| 2004/0056006 A1* | 3/2004 | Jones .................. B29C 65/1683 219/121.64 |
| 2007/0028997 A1* | 2/2007 | Best .................. B29C 66/73921 139/383 R |
| 2013/0333792 A1* | 12/2013 | Eberhardt ............. D21F 1/0054 139/383 A |

FOREIGN PATENT DOCUMENTS

| | | |
|---|---|---|
| WO | 2009032271 A2 | 3/2009 |
| WO | 2012022629 A1 | 2/2012 |
| WO | WO 2012/022629 * | 2/2012 |
| WO | 2012113767 A1 | 8/2012 |

* cited by examiner

STABILIZED WOVEN SEAM FOR FLAT-WEAVE ENDLESS FABRIC BELTS

BACKGROUND OF THE INVENTION

Field of the Invention

The present invention relates to endless fabric belts for use in machines for paper, cardboard or tissue production and/or processing and refers to a fabric belt which, before being made endless, is present in an open state with two fore-ends and is subsequently made endless in that end portions of the machine direction threads of the two fore-ends are brought together to form junction points and are interwoven with machine cross-direction threads to form a seam region.

The production of paper commences, as a rule, with the formation of a fibrous material web from a fibrous material suspension in the forming part of a paper machine. The suspension and the fibrous material web generated from this by dewatering lie on an endless belt which, deflected via rollers, revolves inside the forming part. In subsequent sections of the paper machine, the fibrous material web formed in the forming part is dewatered further, and, in these sections too, the fibrous material web is transported in a state in which it rests on coverings designed as endless belts.

Yarn is to be understood to mean a long, thin and flexible structure of one or more fibers, that is to say a fiber or a fiber composite, the length of which exceeds its cross-sectional dimensions by a multiple. In the production of fabric belts for paper machine coverings, polymeric monofilaments are predominantly used, that is to say yarns formed from a polymer in the form of a single fiber. In the case of press felt ground fabrics, instead of or in addition to monofilaments, twines twisted together from monofilaments or, more rarely, from staple fiber yarns are also often used. The fabric belts may in this case either form the covering themselves or, for example in the case of the press felts used in the pressing part, serve as a carrier substrate for a fibrous nonwoven structure.

For the production of endless fabric belts, various technologies are known, for example circular weaving or the weaving of insertion seams for releasably connecting the covering ends. Furthermore, flat fabrics produced from monofilaments are also conventionally known, which are closed to form an endless fabric belt by means of what is known as a woven seam.

The production of endless fabric belts for coverings to be used in paper machines usually commences with the weaving of a flat-weave belt, the warp threads forming machine direction threads and the weft threads forming machine cross-direction threads. With a view to improved mechanical load-bearing capacity and bending strength, the flat-weave fabric belts are often built up in one, two or more plies, in which case the individual woven plies may differ from one another in the material, strength and guidance of their yarns. By the regular engagement of yarns of one woven ply to the weave of another woven ply, a stable sheet-like connection of individual woven plies can in this case be achieved.

A flat fabric belt produced in this way is subsequently made to length and is closed endlessly via a seam connecting its end edges. The seam region extends in the machine cross direction over the entire width of an endless fabric belt and can extend in the machine direction over a length of 5 and 70 cm. The machine direction of a belt is to be understood in this context to mean the direction of movement of the belt during intended use in a paper machine. The machine cross direction is to be understood to mean that direction of the fabric belt which extends perpendicularly to the machine direction.

So that the seam region does not cause any marking of the fibrous material web, the dewatering properties and surface structure of the latter must correspond as far as possible to that of the remaining endless fabric belt, designated as full fabric. Ideally, the woven structure of the full fabric continues in the seam region, for which purpose it is necessary to have a weaving process which is to be carried out transversely to the weaving direction of the full fabric and which is carried out either manually or on weaving or stitching machines designed specifically for this purpose, for example a correspondingly adapted Jacquard weaving machine.

To produce the seam region, the machine cross-direction threads are first disengaged from the full fabric at the two fore-ends of a flat-weave fabric belt, in order to expose the end portions of the machine direction threads. The thus exposed end portions of the machine direction threads of one fore-end and the end portions of the machine direction threads of the other fore-end of the fabric belt are subsequently brought together in each case in pairs to form junction points and interwoven with machine cross-direction threads to form the seam region. The strength of seams produced in this way is determined not only by the number and markedness of the bends, but also by the length of what are known as "interlocks", the length of an interlock being defined by the number of machine cross-direction threads with which the end portions, brought together in pairs, of the machine direction threads are jointly interwoven, while the latter run next to one another in parallel. This can be explained in that, in such seams, the seam strength is based essentially on the mechanical clasping of the thread bends at the crossing points of machine direction and machine cross-direction threads and also on the frictional forces between the threads.

In the production of tissue paper, a TAD (Through Air Drying) method, as it is known, is often employed, in which hot air flows through the fibrous material web for drying, while the latter is being guided on what is known as a TAD screen. In order to allow the through flow of air for drying the fibrous material web, such TAD screens may have a high permeability of up to approximately 700 cfm or above. In order to provide high permeability for fluid, TAD screens are often formed by very "open" fabrics which have a lower thread density, as compared with other fabrics for other applications, such as, for example, press felts or forming screens. So as to have no adverse influences during the production of a fibrous material web, the seam region of such TAD screens should have an identical or at least almost identical permeability for fluid, such as, for example, water or air or gases, to that of the full fabric.

So that a sufficiently high strength of the seam can be achieved, it is necessary, particularly in the case of "open" fabric belts, for the selected overlap region of the interlock-forming machine direction threads to be as large as possible and consequently for the selected length of the interlock to be as large as possible. Since permeability is greatly reduced in the region of the interlocks, the interlocks of a great length have the effect that the permeability in the seam region often deviates to an unacceptable extent from the permeability in the full fabric.

In the prior art, it is proposed to reinforce the seam region by means of a materially integral connection of the threads by virtue of the action of laser energy. For this purpose, WO2009/032271 proposes, for example, to reinforce the strength of the seam in that, in the seam region, the machine direction threads and/or the machine cross-direction threads are positively connected to one another at yarn contact points in the region of a plurality of strips running in the machine cross direction.

The seam connections thus made, in which the seam strength is influenced substantially by a materially integral connection between the threads, have a markedly increased seam strength, as compared with the seam connections held solely by means of frictional forces.

In the fabric belts known from the prior art, there is the problem that the end portions of the machine direction threads may emerge from the fabric, since they are often not anchored firmly in the fabric. This may result, on the one hand, in an adverse influence upon the quality of the fibrous material web produced, since the emergence of the thread ends may give rise to holes in the fabric belt, and, furthermore, the thread ends which have emerged may poke out of the surface of the fabric belt and damage the fibrous material web. Moreover, the thread ends which have emerged may be a starting point for separation of the machine direction threads from the fabric. The disadvantages described above occur particularly in fabric belts with an open woven structure and in those with an only small number of plies of machine direction and/or machine cross-direction threads.

BRIEF SUMMARY OF THE INVENTION

The object of the present invention is to propose an endless fabric belt which does not have the above disadvantages or has them only to a greatly reduced extent.

The object is achieved by means of an endless fabric belt for use as covering in a paper, cardboard or tissue machine, which fabric belt comprises machine direction threads and machine cross-direction threads intersecting with these, at least some of the machine direction threads and/or machine cross-direction threads being formed by yarns which are composed essentially of a thermoplastic polymer material transparent to light of a wavelength or of a wavelength range. The endless fabric belt according to the invention, before being made endless, is present in an open state with two fore-ends and is subsequently made endless in that end portions of the machine direction threads of one fore-end and end portions of the machine direction threads of the other fore-end of the fabric belt are brought together in each case in pairs to form junction points and are interwoven with machine cross-direction threads to form a seam region. Furthermore, at least some of the yarns in the seam region are connected to one another in a materially integral manner by means of a light-absorbing material arranged at yarn contact points and by the action of the light at the yarn contact points. The endless fabric belt according to the invention is characterized in that, in the seam region, a plurality of, in particular three or more, strip-shaped fabric portions spaced apart from one another are formed, in which the, that is to say all, junction points and the, that is to say all, yarn contact points connected to one another in a materially integral manner are arranged, and in each case a strip-shaped fabric portion without junction points and without a materially integral connection of the yarn contact points is formed between two directly adjacent fabric portions comprising the junction points.

Since yarns in the seam region are connected to one another in a materially integral manner, the strength of the seam is markedly increased.

By the materially integral connection points of the yarns being arranged in a plurality of strip-shaped regions spaced apart from one another, the flexural strength of such a "welded seam" can be markedly reduced, as compared with a seam welded along the entire length of the seam region. Furthermore, the stretching of the fabric belt can thereby be reduced, and also the shear strength can be increased, transverse distortion of the fabric belt thereby being prevented.

Since, furthermore, the junction points are concentrated in the strip-shaped regions in which yarns are connected to one another in a materially integral manner, the machine direction threads are additionally fixed in the region of their ends as a result of the materially integral connection. Emergence and separation of the thread ends is therefore effectively reduced or even prevented.

This is expedient particularly in fabric belts which are formed from two or fewer plies of machine direction threads and/or two or fewer plies of machine cross-direction threads and/or which have an "open" woven structure to provide high permeability, consequently with few and "flat" thread bends.

Furthermore, by virtue of the materially integral connection of yarns in the seam region, in spite of a sufficiently high seam strength the selected length of the interlocks can be extremely short, so that a permeability equal or similar to that in the full fabric is obtained in the seam region.

The term "transparent" is to be understood in this publication to mean that a medium transparent to light from a specific wavelength range does not absorb this light or absorbs it to such a slight extent, for example a maximum of 10%, that no softening of the medium occurs.

The term "seam region" is understood to mean that region of the endless fabric belt which is newly interwoven when the fabric belt is made endless.

Advantageous refinements and developments of the invention are specified in the subclaims.

Preferably, each of the strip-shaped regions containing the junction points extends over the entire width of the fabric belt. Preferably, the strip-shaped regions containing the junction points are arranged so as to be spaced apart from one another in the machine direction.

It is conceivable, in particular, that the fabric belt present in an open state is produced, woven flat.

Various possibilities for forming junction points are conceivable. A junction point may be, for example, a point at which the two brought-together end portions of the machine direction threads are the two end portions of one and the same machine direction thread. It is also conceivable, however, that the two brought-together end portions of the machine direction threads are end portions of different machine direction threads. If the two brought-together end portions are those of different machine direction threads, these are offset to one another in the fabric by the amount of a maximum of five, preferably a maximum of one machine cross-direction thread repeat, especially preferably by the amount of a maximum of two machine direction threads.

The end portions may meet one another at the junction point and be interwoven jointly with no machine cross-direction thread or be interwoven jointly with one or more machine cross-direction threads. In the first instance mentioned, the weaving paths of the two brought-together machine direction threads meet one another. In the second instance mentioned, the weaving paths of the two machine direction threads overlap one another and the end portions run at least partially next to one another.

In both instances mentioned above, the end portions of the two machine direction threads may touch one another.

It is also conceivable that the two brought-together end portions terminate so as to be spaced apart from one another, as seen in the machine direction, as a result of which one and a maximum of two machine cross-direction threads, which are interwoven with neither of the two end portions, are arranged at the junction point. In the last-mentioned case, the weaving paths of the two end portions brought together at the junction point terminate so as to be spaced apart from one another by one or a maximum of two machine cross-direction threads. In this respect, it is conceivable, in particular, that the end portions in each case brought together in pairs and forming junction points leave the fabric together at the respective junction point by running between two directly successive weft threads.

Preferably, the wavelength or the wavelength range lies in the near-infrared range, in particular in the wavelength range of 700 nm to 1200 nm, so that, for the materially integral connection of the yarn contact points, conventional NIR transmission laser welding devices and methods can be used, such as, for example, diode lasers with emission wavelengths in the range of 808 to 980 nm or Nd:YAG lasers with an emission wavelength of 1064 nm or infrared radiators. The power of the light source used may in this case lie in the range of approximately 100-600 watts.

To connect the yarn contact points, the light source and the fabric belt are preferably moved in relation to one another, in which case it has proved advantageous if the relative speed between the light source and fabric belt lies in the range of 5 mm/s to 50 mm/s. It is advantageous, furthermore, if the light beam directed onto the fabric belt has a longitudinal extent, also called line width, which is directed parallel to the machine direction and which is wider than the longitudinal extent of the respective strip-shaped fabric portions containing the junction points and materially integral connections. By virtue of this sheet-like form of the laser beam, the junction point regions can be treated reliably and quickly. Alternatively, punctiform treatment would also be conceivable, but this is more time-intensive.

It is conceivable that at least some of the yarn contact points connected to one another in a materially integral manner are formed at points at which machine direction threads and machine cross-direction threads intersect one another.

In order to obtain a good materially integral connection at the yarn contact points, it is advantageous, in particular, if, during the action of the light, the yarn contact points to be connected in a materially integral manner are pressed one against the other by the action of an external force. If, for example, the yarn contact points formed by crossing points of machine direction threads and machine cross-direction threads are to be connected to one another in a materially integral manner, the external force necessary for pressing them one against the other may be generated, for example, in that the endless fabric belt is tensioned during the action of the light. Additionally or alternatively to this, it is also conceivable for the threads to be pressed at the yarn contact points by means of a pressure roller which, in particular, is transparent to light.

Additionally or alternatively to this, it is conceivable that at least some of the yarn contact points connected to one another in a materially integral manner are formed at points at which the brought-together end portions of the machine direction threads run next to one another and touch one another.

Preferably, light-absorbing material is introduced into the polymer material of at least some of the yarns. Alternatively or additionally to this, it is conceivable that at least some of the yarns are coated with the light-absorbing material. The coating may be applied as a liquid coating. The liquid coating material used may be, for example, a material which is sold by the company Gentex under the designation "Clearweld".

It is conceivable that at least some, in particular all, of the machine cross-direction threads which are arranged in the region of the strips containing the junction points comprise light-absorbing material. It is in this case conceivable, in particular, that the machine direction threads are transparent to light and only the machine cross-direction threads which are arranged in the region of the strips containing the junction points comprise the light-absorbing material, the machine direction threads and the machine cross-direction threads being connected to one another in a materially integral manner at the points at which the machine direction threads and the machine cross-direction threads intersect one another in the region of the strips containing the junction points.

Additionally or alternatively to this, it is conceivable that at least some of the machine direction threads comprise light-absorbing material along their longitudinal extent in the region of the strips containing the junction points.

It is in this case conceivable, in particular, that the machine cross-direction threads are transparent to light and the machine direction threads comprise light-absorbing material at least along their longitudinal extent in the region of the strips containing the junction points, the machine direction threads and the machine cross-direction threads being connected to one another in a materially integral manner at the points at which the machine direction threads and the machine cross-direction threads intersect one another in the region of the strips containing the junction points.

The light-absorbing material may comprise, for example, carbon black and/or color pigments and/or CNT. Tests by the applicant have shown that, for a good balance between sufficient absorption capacity and no adverse influence upon the thread properties due to the absorbing material, it is advantageous if the absorbing material has in the polymer material of the yarns a fraction of 0.1% by weight to 10% by weight, preferably 1% by weight to 3% by weight.

The solution according to the invention is advantageous especially when the endless fabric belt is an open fabric and/or a fabric with only a few fabric plies. Preferably, therefore, the endless fabric belt is formed by a fabric which has a maximum of two plies of machine direction threads and one ply of machine cross-direction threads or a maximum of two plies of machine cross-direction threads and one ply of machine direction threads or one ply of machine cross-direction threads and one ply of machine direction threads. It is also conceivable, in this respect, that the endless fabric belt has a thread density of 20 to 100 machine direction threads per inch and/or a thread density of 10 to 90 machine cross-direction threads per inch.

The endless fabric belt may be, in particular, a structured screen or drying screen. The structured screen may be used, for example, as a TAD screen. The abovementioned thread densities are appropriate particularly for structured screens. Such screens may have a permeability in the range of 300 to 1100 cfm. Furthermore, the endless fabric belt may also be a press belt for use in a belt press arrangement, as described, for example, in WO2005/075736, which press belt is produced, woven flat, and is subsequently made endless and which is suitable to be operated under a tensile stress of at least 30 kN/m. The abovementioned screens usually have a maximum of two warp thread plies and one weft thread ply or a maximum of two weft thread plies and one warp thread ply or one weft thread ply and one warp thread ply.

Preferably, the endless fabric belt according to the invention is designed in such a way that the permeability in the region of the strips comprising the junction points deviates from the permeability of the fabric belt outside the seam region by a maximum of 15%, preferably a maximum of 10%, especially preferably a maximum of 6%. A fabric belt designed, for example, as a TAD screen is thereby provided, which has a very high seam strength, along with a permeability to gas and liquid which is homogeneous over its entire length.

In order to ensure good flexibility of the endless fabric belt in the seam region, there is provision, in particular, whereby, in the seam region, the strip-shaped fabric portions containing the junction points have a smaller extent in the machine direction than the strip-shaped fabric portions arranged between these and comprising no junction points.

In concrete terms, the strip-shaped fabric portions comprising the junction points may have an extent in the machine direction in the range of 5 to 60 mm and/or the strip-shaped fabric portions arranged in the seam region and comprising no junction points may have an extent in the machine direction in the range of 10 to 80 mm. Furthermore, the seam region of the endless fabric belt may have an extent in the machine direction in the range of 5 to 50 cm. The seam region may, in particular, be reduced in size due to the laser treatment, as compared with an identical fabric belt without laser treatment in the seam region.

Further features of the invention may be gathered from the following description of exemplary embodiments, in conjunction with the claims and the figures. The individual features may also be implemented in an embodiment according to the invention in a different number and combination from those in the examples given below. In the following explanation of some exemplary embodiments of the invention, reference is made to the accompanying figures of which

DESCRIPTION OF THE INVENTION

Elements, components or regions which perform essentially identical technical functions are given the same reference symbols in the figures. Different embodiments of these elements, components or regions have similar reference symbols.

Figure 1:
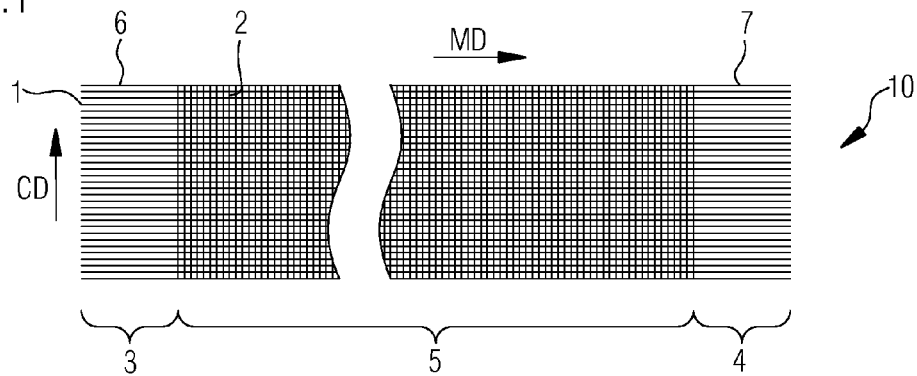
FIG. 1 shows a diagrammatic illustration of a flat-weave belt prepared for the seam connection.

The diagrammatic illustration of FIG. 1 shows a flat-weave fabric belt 10 made to length, with fore-ends 3 and 4 prepared for forming a woven seam. The present fabric belt 10 is formed by a fabric composed of one weft thread ply and one warp thread ply. The machine direction threads 1 of the fabric 10 which extend in the machine direction MD intersect in a specific pattern with the machine cross-direction threads 2 extending perpendicularly to these in the machine cross direction CD. For the sake of clear illustration, in each case only one machine direction thread and one machine cross-direction thread are given a reference symbol. Furthermore, to better illustrate the essential features of the flat-weave fabric belt prepared for endless connection, the spacing and number of machine direction and machine cross-direction threads and also the weave and dimensions of the fabric belt 10 are selected without reference to concrete embodiments.

To manufacture an endless flat-weave fabric belt, the two fore-ends 3 and 4 of the fabric belt 10 must be connected to one another. So that the connection point does not have a dewatering characteristic which is different from that of the rest of the endless fabric belt and which could lead to markings of the fibrous material web, the ends 3 and 4 are connected to one another to form a woven seam. In preparation for this, the machine cross-direction threads 2 have been removed from the regions of the two ends 3 and 4, as illustrated in FIG. 1. The ends 3 and 4 therefore have only end portions 6, 7 machine direction threads. Since no threads and, in particular, also no machine cross-direction threads 2 are detached from the region 5 lying between the two ends 3 and 4, the original weave is retained completely in this region 5, designated as full fabric.

To form a seam region 8, the two fore-ends 3 and 4 of the flat-weave fabric belt 10 are connected to one another in that the end portions 6 of the machine direction threads 1 of one fore-end 3 and the end portions 7 of the machine direction threads 1 of the other fore-end 4 of the flat-weave fabric belt 10 are in each case brought together in pairs to form junction points (illustrated in FIG. 6) and are interwoven with machine cross-direction threads 2.

Figure 2:
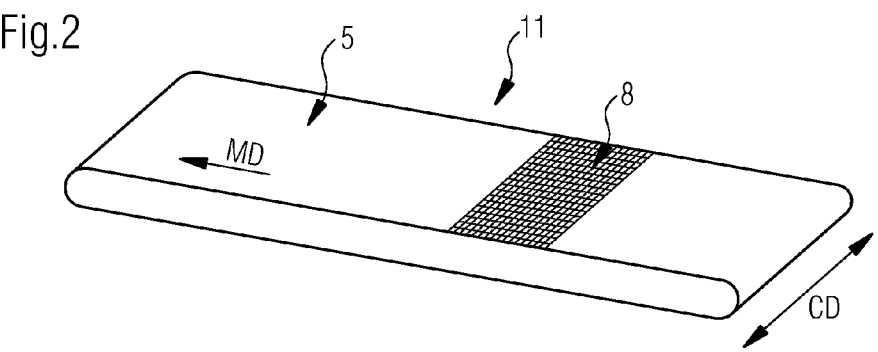
FIG. 2 shows a diagrammatic illustration of an endless fabric belt closed by means of a seam connection.

The result of the woven seam process is an endless fabric belt 11 with a seam region 8, as is shown in the highly diagrammatic illustration of FIG. 2. This illustration has avoided showing the weave in the full fabric region 5 for the sake of emphasizing the seam region 8. Furthermore, FIG. 2 indicates the directional designations used in this publication, that is to say the machine direction MD of the endless fabric belt 11 during intended use in a machine for producing and/or processing a fibrous material web and the machine cross direction CD, oriented transversely thereto, of the belt 11.

On account of the interruption in the machine direction threads 1 at the junction points, only lower tensile forces can be absorbed via the junction points than via the full fabric 5. Any tensile load upon the endless fabric belt 11 therefore leads to an opening or widening of the seam region 8 whenever the tensile forces acting upon the junction points cannot be transferred to other threads of the fabric. In a seam region, such transfer of force to other yarns is possible, for example, at the intersections of the warp or machine direction thread with weft or machine cross-direction threads adjacent to the junction point. However, since the transfer of force is limited by the static friction of the yarns at the intersections, the junction points therefore constitute a weak point of the seam region.

To improve the transfer of force to adjacent yarns, in the seam region 8 end portions 6, 7 of the machine direction threads 1 and machine cross-direction threads 2 are connected to one another in a materially integral manner by laser light radiation at yarn contact points formed by crossing points.

Figure 3A:
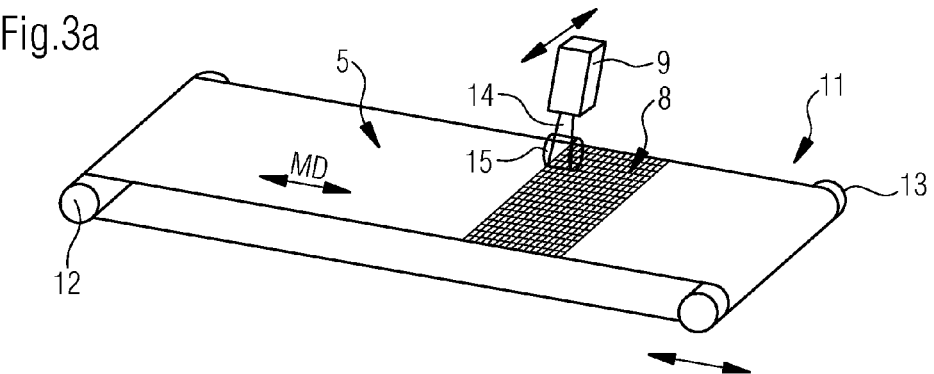
FIG. 3a shows a diagrammatic illustration of a device for the transmission welding of yarn intersections in the region of the seam region of an endless fabric belt.
Figure 3B:
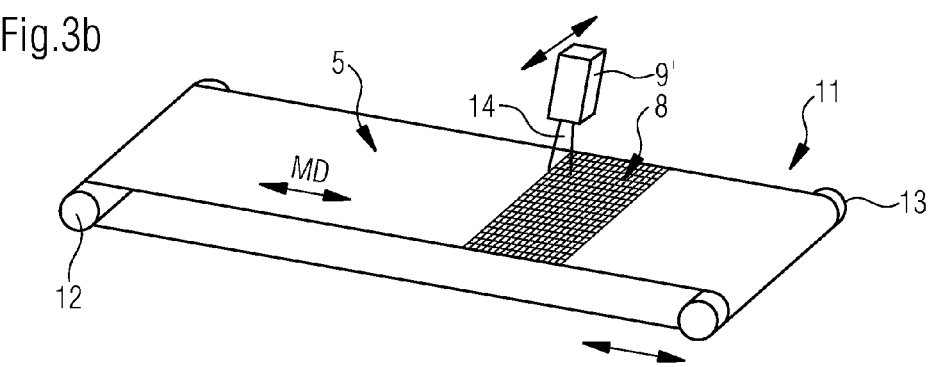
FIG. 3b shows a diagrammatic illustration of another device for the transmission welding of yarn intersections in the region of the seam region of an endless fabric belt.

In the present case, the stabilization of the seam region 8 by means of the materially integral connection of the yarn intersections is carried out with the aid of a transmission welding method, explained above. For this purpose, the fabric belt 11 made endless is first tensioned, for example, by means of two rollers 12 and 13, as illustrated in FIGS. 3a and 3b, at least one of the two rollers 12, 13 being mounted displaceably, as indicated in FIGS. 3a and 3b, in order to tension the fabric belt 11 and therefore also the seam region 8. The device may, of course, also contain further rollers, with the aid of which the belt 11 can be deflected more than once, in order thereby to acquire a shorter form of construction of the plant. Other suitable devices have a tension device in which only a subregion, comprising the seam region 8, of the endless fabric belt 11 is tensioned, for example with the aid of clamping tongs.

For the welding of machine direction and machine cross-direction threads at the intersection points, a light 14 radiated by a laser 9 emitting in the near-infrared range or by an infrared radiator is guided onto the intersections to be welded of machine direction and machine cross-direction threads. Suitable lasers are, for example, diode lasers with emission wavelengths in the range of 808 to 980 nm and Nd:YAG lasers with an emission wavelength of 1064 nm. Preferably, lasers or infrared radiators with emissions from the range of about 700 to 1200 nm are used, since light in this wavelength range is absorbed by the yarns of the fabric to an extent which does not cause or which only slightly causes heating of the yarns.

In the device illustrated in FIG. 3a, the laser light 14 is radiated in a fan-shaped manner by the light source 9 and is converged linearly, by a roller 15 transparent to the light used, onto the contact surface between the roller 15 and seam region 8. The fan-shaped light beam 14 can be generated both by the rapid deflection of the laser light and statically by means of suitable optics. The laser energy concentrated linearly by means of the roller 15 is converted, by light-absorbing material arranged in the radiation region, into thermal energy which finally leads to melting of the yarns in the region of the absorbing material. The pressure exerted upon the fabric by the roller 14 is conducive to the materially integral connection between yarns which touch one another at a melting zone.

In the device illustrated in FIG. 3b, the welding light 14 (either laser light or light from a suitable infrared radiator) radiated in a fan-shaped manner by the welding head 9' is aimed directly onto the seam region 8. The device therefore has no roller transparent to the welding light in the radiation path. In this device, the contact pressure between the yarns which is caused by the thread guidance is utilized at their intersections in order to promote a materially integral connection. The contact pressure may be reinforced by tensioning the endless fabric belt 11, for example with the aid of the two rollers 12, 13.

In the case of devices such as those illustrated in FIGS. 3a and 3b, it is sufficient, for irradiating any selectable subsurfaces on the seam region 8, to have a movability of the laser head 9 (or some other suitable light source) and roller 15 or the welding head 9' transversely to the machine direction MD, that is to say in the machine cross direction CD of the endless fabric belt 11, since displacement of the seam region 8 in relation to the welding light 14 in a machine direction MD can be carried out by means of the rotation of the rollers 12, 13.

For the welding of yarn intersections in the seam region 8, the radiated light must be absorbed between the yarns touching one another at the intersections. For this purpose, for example, one of the intersecting threads may be formed such that it absorbs the light used for welding. This is brought about, for example, in that light-absorbing material is introduced into the polymer material of this thread. It is also conceivable, however, that light-absorbing material is introduced between the yarns, for example in the form of a coating, at the intersection points.

Yarns which absorb light in the near-infrared range may be produced, for example, by the introduction of carbon, for example in the form of carbon black, graphite or carbon nanotubes, into the thermoplastic polymer material. Absorber solutions to be applied as a coating to the welding points are offered, for example, by the company Gentex under the name "Clearweld". However, suitable colorants, which, dissolved in a solvent, are applied to the yarns, may also be used.

Figure 4:
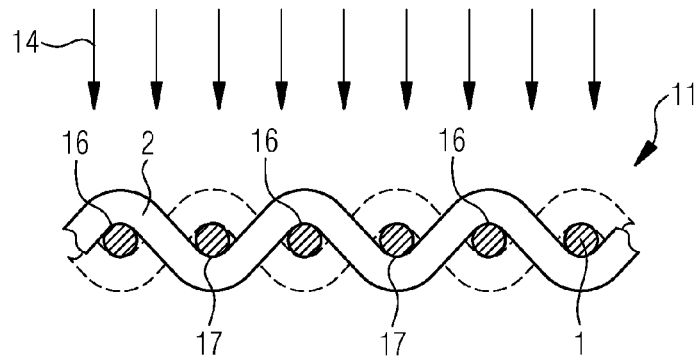
FIG. 4 shows a diagrammatic illustration of a form of materially integral connections when welding light-absorbing machine cross-direction yarns are used.

When yarns absorbing the welding light 14 are employed, these are used preferably either as machine cross-direction threads 2 in the seam region 8 or as machine direction threads 1 of the endless fabric belt 11, so that some of the yarn intersections can be welded. The first case is shown in FIG. 4 which illustrates a section, running in the machine cross direction CD of the belt 11, through part of the seam region 8. FIG. 4 shows two machine cross-direction threads 2 which are arranged one behind the other and which intersect machine direction threads 1 illustrated in cross section. The machine cross-direction threads 2 absorb welding light 14 which is radiated from above onto the fabric, the machine direction threads 1 being transparent to this light. The following discussion relates to the crossing points of the machine cross-direction thread 2, at the front in FIG. 4, with the machine direction threads 1. The welding light 14 reaches no yarn intersection 16 which is covered with respect to the light radiation by a machine cross-direction thread 2, so that these yarn intersections 16 are not melted by the welding light 14. At the other intersection points 17, at which the machine direction threads 1 transparent to the radiated welding light 14 lie above the machine cross-direction threads 2 absorbing the welding light 14, the welding light 14 reaches the yarn contact points 17 between the yarns and can heat the machine cross-direction thread 2 there such that a materially integral connection of the two yarns is brought about at this point.

Figure 5:
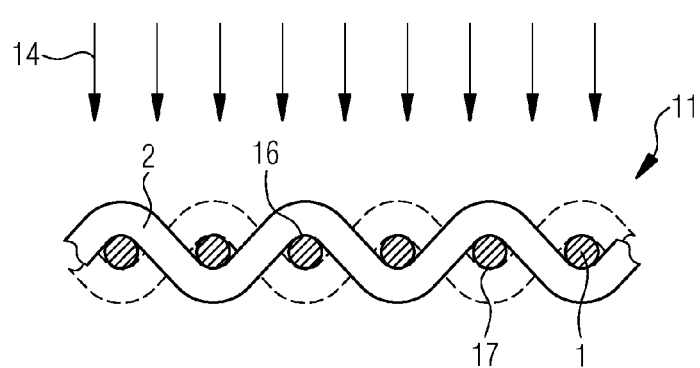
FIG. 5 shows a diagrammatic illustration of a form of materially integral connections when welding light-absorbing materials introduced selectively between yarn intersections are used.

So that, as illustrated in FIG. 5, all the yarn intersections in the welding region can be connected to one another in a materially integral manner, the welding region may either be irradiated with welding light from both sides of the fabric or solely yarns transparent to the welding light 14 may be used in the welding region. A material (not illustrated in the figure) which absorbs welding light 14 is introduced between the yarns at the intersection points of machine direction and machine cross-direction threads. By an appropriate selective application of absorber at the yarn contact points 16, 17 only, the welding light 14 can penetrate through all the yarns and is absorbed solely by the absorber material which is arranged between the intersections and which consequently heats up and leads to melting of the surrounding yarn regions. The melting of the yarn regions touching one another finally causes the materially integral connection to be made.

Figure 6:
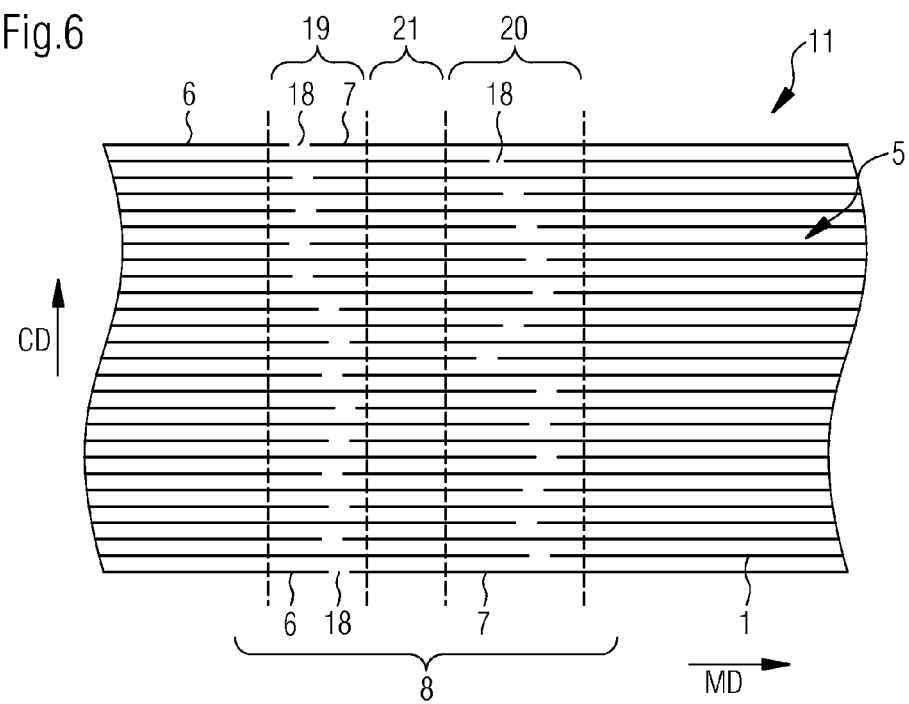
FIG. 6 shows a diagrammatic illustration of the basic principle of a seam region of low rigidity which is stabilized by means of transmission welding.

FIG. 6 shows an enlargement of a detail of the endless fabric belt 11, in which the seam region 8 is emphasized.

It can be seen that in each case an end portion 6 of the machine direction threads 1 of one fore-end and an end portion of the machine direction threads 1 of the other fore-end of the fabric belt 1 are brought together in pairs to form in each case a junction point 18 and are interwoven with machine cross-direction threads (not illustrated) to form the seam region. It will be noted in this case that only some of the end portions 6, 7 and junction points 18 are given a reference symbol in FIG. 6 for the sake of clarity.

Portions of the full fabric 5 of the endless belt 11 can be seen on both sides of the seam region 8. The seam region 8 illustrated in FIG. 6 comprises in the present case two strip-shaped fabric portions 19, 20 which are spaced apart from one another and in which the, that is to say all, junction points 18 and the, that is to say all, yarn contact points of the fabric belt 11 which are connected to one another in a materially integral manner are arranged. Between the two directly adjacent fabric portions 19, 20 comprising the junction points 18 is formed a strip-shaped fabric portion 21 in which no junction points and no yarn contact points connected to one another in a materially integral manner are formed.

It can be seen, furthermore, that all the strip-shaped fabric portions 19-21 extend over the entire width of the fabric belt in the machine cross direction CD of the fabric belt.

In the present case, the yarn contact points connected to one another in a materially integral manner are formed at the crossing points of the machine direction threads 1 with the machine cross-direction threads 2, in the present case the machine cross-direction threads 2 comprising the absorbing material in such a way that the latter is introduced into the polymer material of the machine cross-direction threads 2. The absorbing material may in this case comprise, for example, carbon black and/or color pigments and/or CNT.

In the present exemplary embodiment, the two strip-shaped fabric portions 19, 20 comprising the junction points have an extent of 5 to 60 mm in the machine direction MD, the strip-shaped fabric portion 21 which is arranged between the two strip-shaped fabric portions 19, 20 and comprises no junction points having an extent of 20 to 80 mm in the machine direction MD. Furthermore, the seam region has an extent in the machine direction in the range of 5 to 50 cm.

FIGS. 7a-7d show various possibilities for forming junction points 18.

Figure 7A:
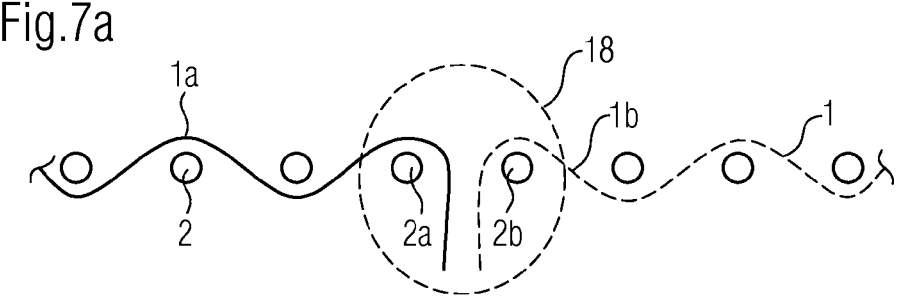
FIGS. 7a, 7b, 7c and 7d show various possibilities for forming junction points.

FIG. 7a shows a junction point 18 in which the two brought-together end portions 1a and 1b of one and the same machine direction thread 1 can be seen. In the present exemplary embodiment, the end portions 1a and 1b meet one another in that they are tied off via two directly adjacent machine cross-direction threads 2a and 2b and are led jointly downward out of the fabric between these two machine cross-direction threads 2a, 2b. The junction point 18 extends from the machine cross-direction thread 2a as far as the machine cross-direction thread 2b, as seen in the machine direction MD.

Figure 7B:
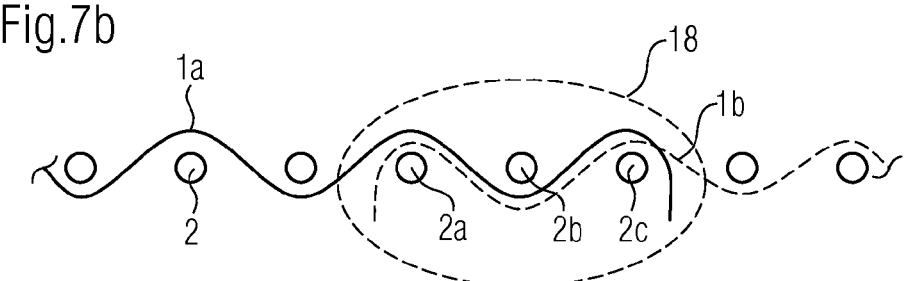

FIG. 7b shows a junction point 18 in which the two brought-together end portions 1a and 1b of one and the same machine direction thread 1 can be seen. In the present exemplary embodiment, the end portions 1a and 1b meet one another in that they are jointly interwoven with three directly adjacent machine cross-direction threads 2a, 2b and 2c before the end portions 1a and 1b are led out of the fabric. The junction point 18 extends from the machine cross-direction thread 2a as far as the machine cross-direction thread 2c, as seen in the machine direction MD.

Figure 7C:
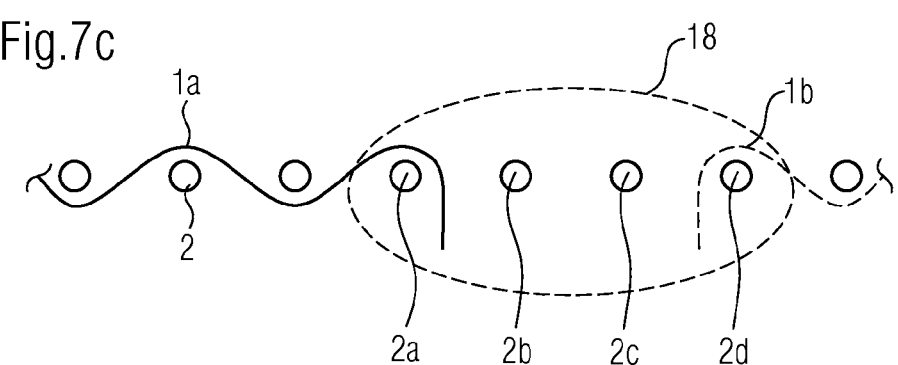

FIG. 7c shows a junction point 18 in which the two brought-together end portions 1a and 1b of one and the same machine direction thread 1 can be seen. In the present exemplary embodiment, the two end portions 1a, 1b are led, spaced apart from one another by the amount of two machine cross-direction threads 2a, 2b, out of the fabric, as seen in the machine direction, as a result of which the two machine cross-direction threads 2a, 2b which are interwoven with neither of the two end portions 1a, 1b are arranged at the junction point 18. The junction point 18 extends from the machine cross-direction thread 2a as far as the machine cross-direction thread 2d, as seen in the machine direction MD.

Figure 7D:
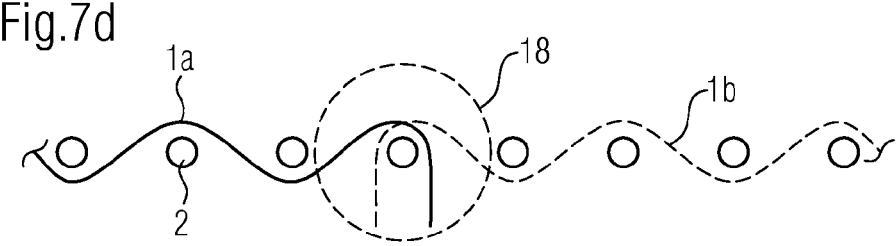

FIG. 7d shows a junction point 18 in which the two brought-together end portions 1a and 1b of one and the same machine direction thread 1 can be seen. In the present exemplary embodiment, the end portions 1a and 1b meet one another in that they are jointly interwoven with a machine cross-direction thread 2a before the end portions 1a, 1b are led out of the fabric. The junction point 18 is restricted to the machine cross-direction thread 2a, as seen in the machine direction MD.

All the versions shown in FIGS. 7a-7d are shown for end portions of one and the same machine direction thread. However, the above statements apply in the same way to brought-together end portions of different machine direction threads.

In conclusion, it is pointed out that the terms "comprise", "have", "involve", "contain" and "with" and also their grammatical modifications, which are used in this description and the claims in order to list features, are to be interpreted in general as an incomplete list of features, such as, for example, method steps, devices, regions, sizes and the like, and are in no way to rule out the presence of other or additional features or groupings of other or additional features.

The invention claimed is:

1. An endless fabric belt, the belt comprising:
cross-direction threads and machine direction threads intersecting said cross-direction threads, at least some of said machine direction threads and/or machine cross-direction threads being formed by yarns composed substantially of a thermoplastic polymer material transparent to light of a given wavelength;
said threads, prior to being formed into the endless belt, together forming an intermediate open fabric belt with two fore-ends having end portions of said machine direction threads to be brought together in each case in pairs for subsequently forming the endless belt;
a seam region connecting said two fore-ends together, with said end portions of said machine direction threads forming junction points and being interwoven with machine cross-direction threads;
wherein at least some of said yarns in said seam region are connected to one another in a materially integral manner by way of a material absorbing light at the given wavelength and arranged at yarn contact points and by the action of the light at the yarn contact points;
said seam region containing a plurality of mutually spaced-apart, strip-shaped fabric portions extending in the cross direction and having said junction points and said yarn contact points connected to one another in a materially integral manner arranged therein, and in each case a strip-shaped fabric portion without junction points formed between two directly adjacent fabric portions having said junction points; and wherein the strip-shaped fabric portions containing the junction points have an extent in the machine direction in a range from 5 to 60 mm and said junction points are distributed throughout the strip-shaped fabric portions and offset in the machine direction relative to one another.

2. The endless fabric belt according to claim 1, wherein said strip-shaped fabric portions extend over an entire width of the fabric belt in the machine cross direction of the fabric belt.

3. The endless fabric belt as claimed in claim 1, wherein the given wavelength lies in the near-infrared range.

4. The endless fabric belt according to claim 1, wherein at least some of the yarn contact points connected to one another in a materially integral manner are formed at points at which machine direction threads and machine cross-direction threads intersect one another.

5. The endless fabric belt according to claim 1, wherein at least some of the yarn contact points connected to one another in a materially integral manner are formed at points at which the brought-together end portions of said machine direction threads run next to one another and touch one another.

6. The endless fabric belt according to claim 1, wherein the polymer material of at least some of said yarns has light-absorbing material introduced as an integral part thereof.

7. The endless fabric belt according to claim 6, wherein at least some of said yarns are coated with the light-absorbing material.

8. The endless fabric belt according to claim 1, wherein at least some of said machine cross-direction threads that are arranged in the region of said strips containing the junction points comprise light-absorbing material.

9. The endless fabric belt according to claim 8, wherein said absorbing material is at least one material selected from the group consisting of carbon black, color pigments, and CNT.

10. The endless fabric belt according to claim 1, wherein said absorbing material in the polymer material of the yarns has a fraction of 0.1% to 10% by weight.

11. The endless fabric belt according to claim 1, wherein the endless fabric belt is formed by a fabric which has a maximum of two plies of machine direction threads and one ply of machine cross-direction threads, a maximum of two plies of machine cross-direction threads and one ply of machine direction threads or one ply of machine cross-direction threads and one ply of machine direction threads.

12. The endless fabric belt according to claim 1, wherein the endless fabric belt is a TAD screen.

13. The endless fabric belt according to claim 1, wherein the end portions brought together in each case in pairs and forming junction points are interwoven at the respective junction point with a maximum of no more than three common weft threads.

14. The endless fabric belt according to claim 1, wherein the endless fabric belt has one or both of a thread density of 20 to 100 machine direction threads per inch and a thread density of 10 to 90 machine cross-direction threads per inch.

15. The endless fabric belt according to claim 1, wherein the end portions brought together in each case in pairs and forming junction points are interwoven at the respective junction point with no common weft thread and jointly leave the fabric by running between two successive weft threads.

16. The endless fabric belt according to claim 1, wherein a permeability in the region of the strips comprising the junction points deviates from a permeability of the fabric belt outside said seam region by a maximum of 15%.

17. The endless fabric belt according to claim 1, wherein the strip-shaped fabric portions containing the junction points have a smaller extent in the machine direction than the strip-shaped fabric portions arranged in the seam region and containing no junction points.

18. The endless fabric belt according to claim 1, wherein the strip-shaped fabric portions arranged in the seam region and comprising no junction points have an extent in the machine direction in a range from 10 to 80 mm.

19. The endless fabric belt according to claim 1, wherein the seam region has an extent in the machine direction in a range from 5 to 50 cm.

* * * * *